US008255495B1

(12) United States Patent
Lee

(10) Patent No.: US 8,255,495 B1
(45) Date of Patent: Aug. 28, 2012

(54) DIGITAL IMAGE AND CONTENT DISPLAY SYSTEMS AND METHODS

(75) Inventor: Amy Lee, Mountain View, CA (US)

(73) Assignee: Luminate, Inc., Mountain View, CA (US)

( * ) Notice: Subject to any disclaimer, the term of this patent is extended or adjusted under 35 U.S.C. 154(b) by 0 days.

(21) Appl. No.: 13/427,341

(22) Filed: Mar. 22, 2012

(51) Int. Cl.
 *G06F 15/16* (2006.01)
(52) U.S. Cl. ............... 709/219; 709/203; 709/217
(58) Field of Classification Search .......... 709/203, 709/217, 219, 229
See application file for complete search history.

(56) References Cited

U.S. PATENT DOCUMENTS

| | | | |
|---|---|---|---|
| 6,728,752 B1 | 4/2004 | Chen et al. | |
| 7,117,254 B2 | 10/2006 | Lunt et al. | |
| 7,231,395 B2 | 6/2007 | Fain et al. | |
| 7,251,637 B1 * | 7/2007 | Caid et al. .................... | 706/15 |
| 7,502,785 B2 * | 3/2009 | Chen et al. .................... | 1/1 |
| 7,519,200 B2 | 4/2009 | Gokturk et al. | |
| 7,542,610 B2 | 6/2009 | Gokturk et al. | |
| 7,558,781 B2 | 7/2009 | Probst et al. | |
| 7,599,938 B1 | 10/2009 | Harrison, Jr. | |
| 7,657,100 B2 | 2/2010 | Gokturk et al. | |
| 7,657,126 B2 | 2/2010 | Gokturk et al. | |
| 7,660,468 B2 | 2/2010 | Gokturk et al. | |
| 7,760,917 B2 | 7/2010 | Vanhoucke et al. | |
| 7,783,135 B2 | 8/2010 | Gokturk et al. | |
| 7,792,818 B2 | 9/2010 | Fain et al. | |
| 7,809,722 B2 | 10/2010 | Gokturk et al. | |
| 8,036,990 B1 | 10/2011 | Mir et al. | |
| 8,055,688 B2 | 11/2011 | Giblin | |
| 8,166,383 B1 | 4/2012 | Everingham et al. | |
| 2002/0065844 A1 | 5/2002 | Robinson et al. | |
| 2003/0050863 A1 | 3/2003 | Radwin | |
| 2003/0220912 A1 | 11/2003 | Fain et al. | |
| 2006/0155684 A1 * | 7/2006 | Liu et al. ..................... | 707/3 |
| 2006/0265400 A1 | 11/2006 | Fain et al. | |
| 2007/0118520 A1 | 5/2007 | Bliss et al. | |
| 2007/0157119 A1 | 7/2007 | Bishop | |
| 2007/0203903 A1 | 8/2007 | Attaran Rezaei et al. | |
| 2007/0219968 A1 * | 9/2007 | Frank .......................... | 707/3 |
| 2007/0258646 A1 | 11/2007 | Sung et al. | |
| 2008/0082426 A1 | 4/2008 | Gokturk et al. | |

(Continued)

OTHER PUBLICATIONS

Cascia et al., "Combining Textual and Visual Cues for Content-based Image Retrieval on the World Wide Web," IEEE Workshop on Content-based Access of Image and Video Libraries (Jun. 1998).

(Continued)

*Primary Examiner* — Quang N. Nguyen
(74) *Attorney, Agent, or Firm* — Peter A. Socarras; Bozicevic, Field & Francis LLP

(57) ABSTRACT

Disclosed herein are systems and methods for displaying images and contextually relevant content on a digital content platform, such as a web page. In one embodiment, for example, the systems and methods include: (1) providing a publisher of the image with a reference script for publication with the image, wherein the reference script is a computer-readable instruction that causes an end-user device to call to a content server; and (2) configuring the content server to (a) receive a request for content from the end-user device, (b) identify content that is contextually relevant to the image, (c) deliver the content to the end-user device, and (d) deliver a computer-readable instruction that causes the end-user device to perform an animation that modifies the image and displays the content in a spatial relationship with respect to the image as originally published.

14 Claims, 10 Drawing Sheets

U.S. PATENT DOCUMENTS

| | | |
|---|---|---|
| 2008/0141110 A1 | 6/2008 | Gura |
| 2008/0177640 A1 | 7/2008 | Gokturk et al. |
| 2008/0199075 A1 | 8/2008 | Gokturk et al. |
| 2008/0208849 A1 | 8/2008 | Conwell |
| 2008/0268876 A1 | 10/2008 | Gelfand et al. |
| 2009/0006375 A1 | 1/2009 | Lax et al. |
| 2009/0144392 A1 | 6/2009 | Wang et al. |
| 2009/0158146 A1 | 6/2009 | Curtis et al. |
| 2009/0287669 A1 | 11/2009 | Bennett |
| 2010/0005001 A1 | 1/2010 | Aizen et al. |
| 2010/0077290 A1 | 3/2010 | Pueyo |
| 2010/0260426 A1 | 10/2010 | Huang et al. |
| 2011/0072047 A1 | 3/2011 | Wang et al. |
| 2011/0138300 A1 | 6/2011 | Kim et al. |
| 2011/0173190 A1 | 7/2011 | van Zwol et al. |
| 2011/0196863 A1 | 8/2011 | Marcucci et al. |
| 2011/0280447 A1 | 11/2011 | Conwell |
| 2012/0005209 A1* | 1/2012 | Rinearson et al. ............ 707/737 |
| 2012/0036132 A1* | 2/2012 | Doyle ............................ 707/738 |
| 2012/0054355 A1* | 3/2012 | Arrasvuori et al. ........... 709/229 |

OTHER PUBLICATIONS

Everingham et al., "'Hello! My name is . . . Buffy'—Automatic Naming of Characters in TV Video," Proceedings of the 17th British Machine Vision Conference (BMVC2006), pp. 889-908 (Sep. 2006).

FAQ from Pixazza's website as published on Feb. 22, 2010, retrieved at http://web.archive.org/web/20100222001945/http://www.pixazza.com/faq/.

Galleguillos et al., "Object Categorization using Co-Occurrence, Location and Appearance," IEEE Conference on Computer Vision and Pattern Recognition (CVPR) Anchorage, USA (2008).

Heitz & Koller, "Learning Spatial Context: Using Stuff to Find Things," European Conference on Computer Vision (ECCV) (2008).

Hoiem et al., "Putting Objects in Perspective," IJCV (80), No. 1 (Oct. 2008).

Jain et al., "Fast Image Search for Learned Metrics," Proceedings of the IEEE Conference on Computer Vision and Pattern Recognition (CVPR) (Jun. 2008).

Lober et al., "IML: An Image Markup Language," Proceedings, American Medical Informatics Association Fall Symposium, pp. 403-407 (2001).

Rao, Leena Google Ventures-Backed Pixazza Raises $12 Million for Crowdsourced 'AdSense for Images', published Jul. 18, 2010, retrieved from http://techcrunch.com/2010/07/18google-funded-pixazza-raises-12-million-for-crowdsourced-adsense-for-images/.

Russell & Torralba, "LabelMe: a database and web-based tool for image annotation," International Journal of Computer Vision, vol. 77, Issue 1-3, pp. 157-173 (May 2008).

Torralba, "Contextual Priming for Object Detection," International Journal of Computer Vision, vol. 53, Issue 2, pp. 169-191 (2003).

Venkatesan et al., "Robust Image Hashing" Image Processing Proceedings. 2000 International Conference vol. 3, 664-666 (2000).

* cited by examiner

DIGITAL IMAGE AND CONTENT DISPLAY SYSTEMS AND METHODS

SUMMARY

Disclosed herein are systems and methods for displaying images and contextually relevant content on a digital content platform, such as a web page. In one embodiment, for example, the systems and methods include: (1) providing a publisher of the image with a reference script for publication with the image, wherein the reference script is a computer-readable instruction that causes an end-user device to call to a content server; and (2) configuring the content server to (a) receive a request for content from the end-user device, (b) identify content that is contextually relevant to the image, (c) deliver the content to the end-user device, and (d) deliver a computer-readable instruction that causes the end-user device to perform an animation that modifies the image and displays the content in a spatial relationship with respect to the image as originally published.

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the claimed systems and methods.

DEFINITIONS

Figure 1:
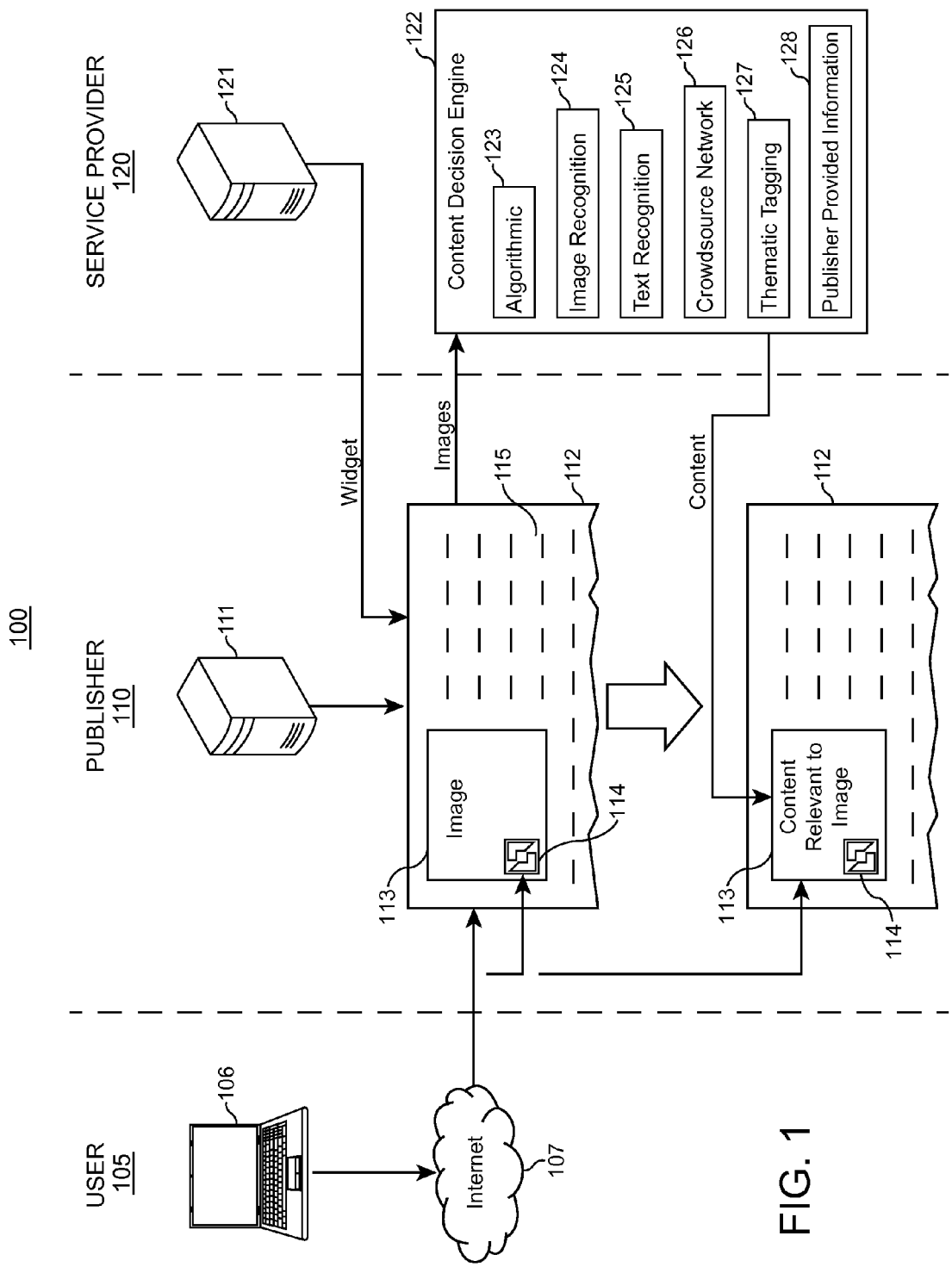
FIG. 1 is a high-level diagram illustrating an embodiment of the present invention.

Prior to describing the present invention in detail, it is useful to provide definitions for key terms and concepts used herein. Unless defined otherwise, all technical and scientific terms used herein have the same meaning as commonly understood by one of ordinary skill in the art to which this invention belongs.

Contextual Information or Contextual Tag: data related to the contents and/or context of digital content (e.g., an image, or content within the image); for example, but not limited to, a description, identification, index, or name of an image, or object, or scene, or person, or abstraction within the digital content (e.g., image).

Contextually Relevant Advertisement: A targeted advertisement that is considered relevant to the contents and/or context of digital content on a digital content platform.

Contextually Relevant Content: Any content (e.g., text, data, images, video, controls, applications, interactive functions, informational functions) selected, created, identified, tagged, and/or provided based at least in part on the subject. For example, "content that is contextually relevant to an image" or "contextually relevant content for the image" includes, without limitation, any content that is selected, created, identified, tagged, and/or provided based at least in part on the image.

Crowdsource Network: One or more individuals, whether human or computer, used for a crowdsourcing application.

Crowdsourcing: The process of delegating a task to one or more individuals, with or without compensation.

Digital Content: broadly interpreted to include, without exclusion, any content available on a digital content platform, such as images, videos, text, audio, and any combinations and equivalents thereof.

Digital Content Platform: broadly interpreted to include, without exclusion, any web page, website, browser-based web application, software application, mobile device application (e.g., phone or tablet application), TV widget, and equivalents thereof.

Image: a visual representation of an object, or scene, or person, or abstraction, in the form of a machine-readable and/or machine-storable work product (e.g., one or more computer files storing a digital image, a browser-readable or displayable image file, etc.). As used herein, the term "image" is merely one example of "digital content."

Proximate: is intended to broadly mean "relatively adjacent, close, or near," as would be understood by one of skill in the art. The term "proximate" should not be narrowly construed to require an absolute position or abutment. For example, "content displayed proximate to an image," means "content displayed relatively near an image, but not necessarily abutting or within the image." (To clarify: "content displayed proximate to an image," also includes "content displayed abutting or within the image.") In another example, "content displayed proximate to an image," means "content displayed on the same screen page or web page as the image."

Publisher: Party that owns, provides, and/or controls a digital content platform; or third-party charged with providing, maintaining, and/or controlling ad space on a digital content platform.

Before the present invention is described in greater detail, it is to be understood that this invention is not limited to particular embodiments described, and as such may vary. It is also to be understood that the terminology used herein is for the purpose of describing particular embodiments only, and is not intended to be limiting. The scope of the present invention will be limited only by the appended claims.

CROSS-REFERENCE TO RELATED APPLICATIONS

Except for any term definitions that conflict with the term definitions provided herein, the following related, co-owned, and co-pending applications are incorporated by reference in their entirety: U.S. patent application Ser. Nos. 12/902,066; 13/005,217; 13/005,226; 13/045,426; 29/387,270; 29/387,271; 29/387,272; 29/387,273; 13/151,110; 13/219,460; 13/252,053; 29/403,731; 29/403,732; 29/403,733; 29/403,734; 29/403,826; 13/296,124; 13/299,280; 13/308,401; and 13/352,188.

DETAILED DESCRIPTION

A growing trend in modern computing devices is to limit screen sizes in order to make devices more compact and portable. For example, where the desktop computer was once commonplace, more recently end-users are accessing software programs and the Internet on small mobile devices, such as tablets and mobile phones. Further, even when a user accesses the Internet on a relatively larger screen/monitor, limitations with the size of web browsers, application interfaces, and pixel count create limitations on the amount of content a publisher can effectively provide on a digital content platform. The problem is compounded when publishers try to cram images, videos, text, and advertisements into a relatively small amount of space, without ruining the aesthetic look of the publication. As such, a publisher desires to maximize their use of "space" when publishing content on a digital content platform.

Images are typically the most information-rich content a publisher can provide. Images provide condensed, high-density information. Publishers, however, seldom have the mechanisms to make an image interactive, so as to provide additional/supplemental content if/when a reader is interested in the image. For example, a travel blog publisher may post an image of a hike he conducted through Yosemite National Park, along with text describing his hike. A reader of the blog may see the image and wonder: How do I get to Yosemite National Park? Where can I buy the bag the hiker is wearing? Where can I buy the shoes the hiker is wearing? How can I share this image with my friends? If the travel blog publisher wishes to add advertisements on how to get to Yosemite National Park, where to buy the hiking bag, where to buy the hiking shoes, a link to share the image with friends, etc., the blog could quickly become overcrowded with information, functionality, etc. Additionally, the travel blog publisher most likely prefers to concentrate his time on creating additional blog postings, instead of trying to identify and create content for all possible end-user considerations relative to each image he publishes.

The present invention generally relates to computer-implemented systems and methods for providing and displaying contextually relevant content for an image published on a digital content platform. The present invention thereby provides means for publishers to effectively maximize their use of space on a digital content platform. In conjunction with the systems and methods presented, a publisher can provide an image on a digital content platform, and a service provider can provide contextually relevant content, relative to the image, if/when a reader (i.e., an end-user) interacts with or shows interest in the image. In one embodiment, for example, the presented systems and methods include: (1) providing a publisher of the image with a reference script for publication with the image, wherein the reference script is a computer-readable instruction that causes an end-user device to call to a content server maintained by a service provider; and (2) configuring the content server to (a) receive a request for content from the end-user device, (b) identify content that is contextually relevant to the image, (c) deliver the content to the end-user device, and (d) deliver a computer-readable instruction that causes the end-user device to perform an animation that displays the content in a spatial relationship with respect to the image as originally published.

As such, in the example provided above, the travel blog publisher would simply publish the blog post with the image of his hike, along with the text describing his hike. The travel blog publisher would also publish his blog post with a reference script that causes a reader's end-user device to call to the service provider. The service provider's system can then analyze the image (via a content decision engine as discussed below) and identify contextually relevant content for the image. If and when the reader shows interest in the image, (by, for example, mousing-over the image, touching/clicking the image, etc.) the service provider then provides the content in a spatial relationship with respect to the image, without affecting any of the other content on the web page. For example, the service provider can provide computer-readable instructions that cause the end-user device to create an animation that flips the image and thereafter displays the contextually relevant content on the apparent "backside" of the image. In another embodiment, the animation completely covers the originally published image with contextually relevant content. By flipping or completely covering the originally published image, the publisher may limit the risk of any potential misunderstanding or misrepresentation of an "endorsement" of the contextually relevant content by the persons or places within the image. The contextually relevant content may include, for example, advertisement links for objects within the image, information about the contents of the image, additional software applications allowing the user to perform functions (such as, save, share, print, etc.) on the image.

The following detailed description of the figures refers to the accompanying drawings that illustrate exemplary embodiments. Other embodiments are possible. Modifications may be made to the embodiments described herein without departing from the spirit and scope of the present invention. Therefore, the following detailed description is not meant to be limiting.

FIG. 1 is a high-level diagram illustrating an embodiment of the present invention. More specifically, FIG. 1 shows a system and method 100 of identifying, providing, and displaying digital content on a digital content platform. As shown in FIG. 1, a user 105 employs an end-user device 106 (e.g., a computer, tablet, mobile phone, television, etc.) to access a publisher's 110 digital content platform 112, via the Internet 107 (or other equivalent network). The digital content platform 112 may be a web page, website, browser-based web application, software application, mobile device application (e.g., phone or tablet application), TV widget, and equivalents thereof. In practice, the publisher 110 publishes digital content (e.g., one or more images 113 and/or text 115) on the digital content platform 112.

A service provider 120 provides a software widget (e.g., web widget, executable computer code, computer-readable instructions, reference script, HTML script, etc.) for inclusion in the digital content platform 112. In one embodiment, the software widget analyzes the digital content platform in order to identify any and all of the images published on the platform. For example, the software widget can provide the function of "scraping" the platform for images (e.g., by walking the DOM nodes on an HTML script of a web page). In one embodiment, the software widget can be configured to identify published images that meet predefined characteristics, attributes, and/or parameters. The software widget then provides (or otherwise identifies) the images to the service provider 120 for further analysis. The analysis of the images typically occurs within a content decision engine 122, which may run within or in conjunction with the service provider's dedicated content server 121.

Within the content decision engine 122, the one or more published images are analyzed to identify contextually relevant content associated with the published image. For example, if the image 113 depicts a professional athlete, contextually relevant content may include information about the athlete's career, recent activities, associated product advertisements, etc. In another example, if the image 113 depicts a vacation setting, the contextually relevant content may include where the setting is located, advertisements on how to get to the vacation site, and other relevant information. Such contextually relevant content is then provided back to the digital content platform 112, for publication in a spatial relationship with respect to the image 113, as further discussed below.

To function as a means for identifying contextually relevant content for the image 113, the content decision engine 122 may employ analysis system components such as: algorithmic identification 123 or analysis of the image; image recognition protocols 124 and analysis of the image; proximate text recognition 125 in search of contextual information of the image based on text 115 published proximate to the image 113; submission of the image to a crowdsource network 126 to identify the context of the image and tag the image with relevant data; a thematic tagging engine 127 to identify and tag the image with relevant data, based on a pre-defined theme; publisher provided information database 128; and/or any combinations or equivalents thereof. Aspects of the system components of the content decision engine 122 are described in the above identified related applications, which have been incorporated by reference herein.

For example, within the algorithmic identification system component 123, an analysis may be performed to identify data, tags, or other attributes of the image. Such attributes may then be used to identify and select contextually relevant content that matches the same attributes. For example, an algorithm may be provided that identifies contextually relevant content having the same subject tag and size of the published image. Such contextually relevant content is then provided back to the end-user device for display in spatial relationship with the originally published image.

Image recognition system component 124 may employ one or more image recognition protocols in order to identify the subject matter of the image. An output of the image recognition system component 124 may then be used to identify and select contextually relevant content to be provided back to the end-user device. Image recognition algorithms and analysis programs are publicly available; see, for example, Wang et al., "Content-based image indexing and searching using Daubechies' wavelts," Int J Digit Libr (1997) 1:311-328, which is herein incorporated by reference in its entirety.

Text recognition system component 125 may collect and analyze text that is published proximate to the image. Such text may provide contextual clues as to the subject matter of the image. Such contextual clues may then be used to identify and select contextually relevant content to be provided back to the end-user device. Examples of text recognition system components are described in U.S. patent application Ser. No. 13/005,217, which has been incorporated herein by reference.

A crowdsource network 126, alone or in combination with the additionally mentioned system components, may also be provided to identify and select contextually relevant content. In one embodiment, for example, a crowdsource network is provided with an interface for receiving, viewing, and/or tagging images published on one or more digital content platforms. The crowdsource network can be used to identify the context of the image and/or identify and select contextually relevant content that is associated with the image. The crowdsource network may be provided with specific instructions on how to best match images with associated content.

A thematic tagging engine 127, alone or in combination with the additionally mentioned system components, may also be provided to identify and select contextually relevant content. In one embodiment, for example, the thematic tagging engine works in conjunction with a crowdsource network to receive, view, and/or tag images published on one or more digital content platforms based on specific themes. Themes may include marketable considerations provided by one or more third-party merchants wishing to use the published images as an advertising mechanism. Examples of thematic tagging systems are described in more detail in U.S. patent application Ser. No. 13/299,280, which has been incorporated herein by reference.

The content decision engine 122 may also be directly linked to the publisher 110 to collect publisher provided information 128 with respect to the published image. For example, the publisher 110 may provide criteria for selecting which images are subject to analysis. The publisher 110 may also be provided with a "dashboard" or interface to configure various settings for the service provider's analysis. For example, the publisher can select what categories of contextually relevant content (e.g., in the form of informational categories, interactive functions, etc.) to be provided with respect to the published images. In one example, the publisher 110 may select interactive applications as described in U.S. patent application Ser. No. 12/308,401, which has been incorporated herein by reference. The publisher 110 may also select what third-party merchants may be used to provide advertisements for any particular image (or subset of images).

In operation, the service provider's software widget monitors the user's 105 interactions with the image 113. If the user 105 activates the image (by, for example, clicking on a hotspot 114, mousing-over the image, viewing the image for a defined period of time, etc.), the software widget sends a call to the service provider 120 (e.g., the service provider's content server 121 and/or content decision engine 122) to request contextually relevant content for the image. The software widget (or an associated "child" widgets) receives the contextually relevant content from the service provider 120, performs an animation on the image 113, and then displays the contextually relevant content in a spatial relationship with respect to the originally published image. For example, in one embodiment, the software widget employs Cascading Style Sheets (CSS) language to perform a "flip" animation on the image 113, so as to show the contextually relevant content on the apparent backside of the image. (In alternative embodiments, other computer language may be used to perform the animate; such as, JavaScript and HTML 5 Canvas.) Preferably, the software widget displays the contextually relevant content within the same pixel profile (i.e., the same pixel space) of the originally published image 113. As such, the contextually relevant content can be displayed without affecting any of the other content published on the digital content platform 112. Further, by providing the contextually relevant content with a spatial relationship with respect to the image 113, the user 105 is more focused on the contextually relevant content, without ruining the original aesthetic design provided by the publisher 110.

Figure 2:
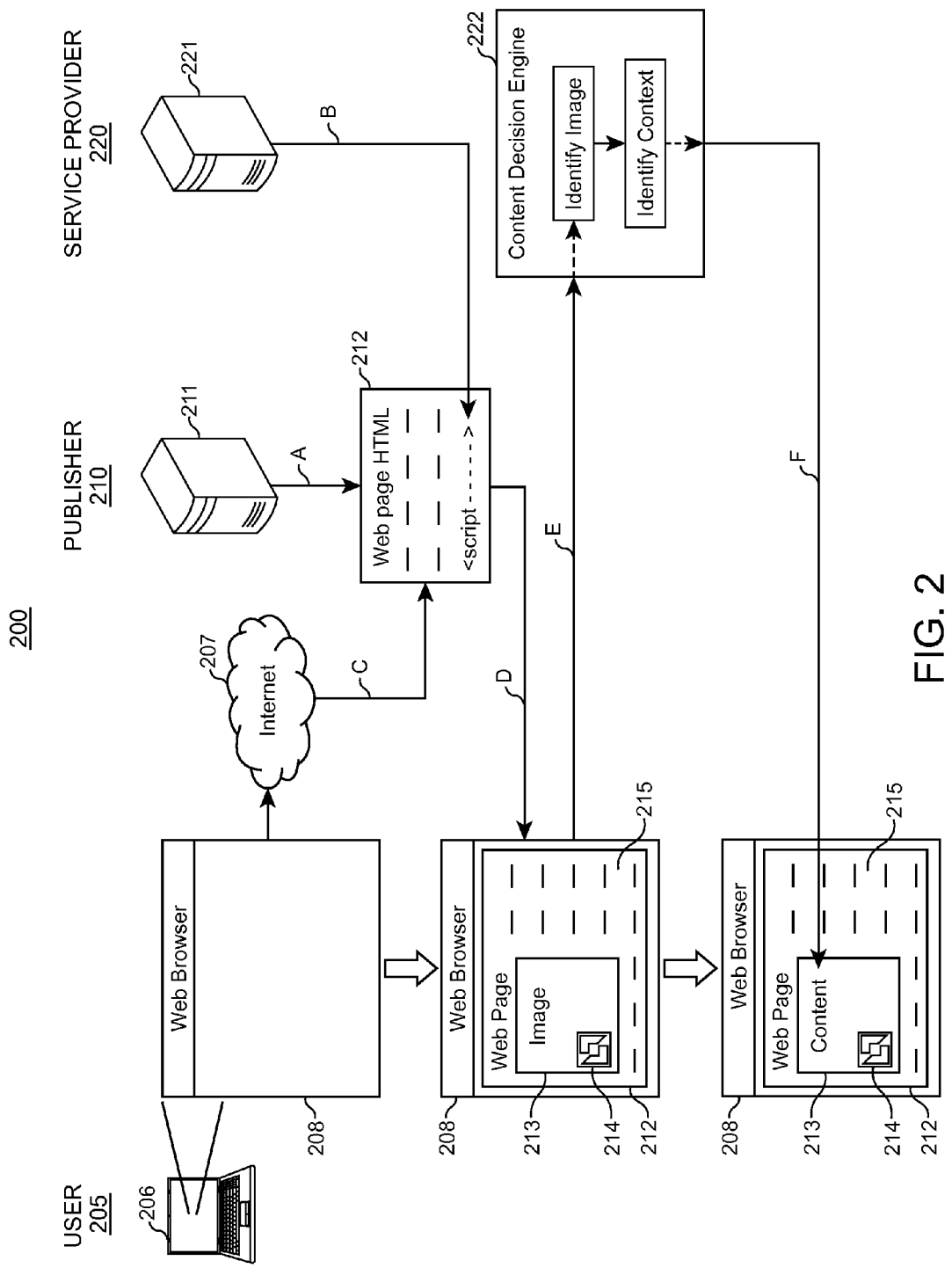
FIG. 2 is a high-level diagram illustrating another embodiment of the present invention.

FIG. 2 is a high-level diagram illustrating another embodiment of the present invention. In FIG. 2, arrows A-F show the process flow of the system and method 200. The system and method 200 of FIG. 2 is described with relation to a digital content platform in the form of a web page. As would be understood by one of skill in the art, the system and method 200 may also be employed in various equivalent digital content platforms, such as, browser-based web applications, software applications, mobile device applications (e.g., phone or tablet applications), TV widgets, and equivalents thereof.

In operation, a publisher 210 maintains an HTML web page script 212 on a server 211 (Arrow A). The publisher 210 also inserts a reference script directed to a dedicated content server 221 maintained by a service provider 220 (Arrow B). A user 205 then employs an end-user device 206 and web browser 208 to access the HTML web page script 212 via the Internet 207 (Arrow C). The user's web browser 208 then loads the HTML web page script as a viewable web page 212 within the web browser 208. The web page 212 may include content such as an image 213 and text 215. The image may include one or more hotspots 214, or other means of activating the image. In one embodiment, the image 213 is not originally published with a hotspot 214, but instead has a hotspot activated after the service provider 220 has identified and analyzed the image.

Arrow E indicates the reference script calling to the service provider 220, and more specifically to the content decision engine 222, in order for the service provider to identify the image and identify content that is contextually relevant to the image. Such contextually relevant content is then returned to the end-user device 206 for display within the web browser 208, as shown by Arrow F. Preferably, the contextually relevant content is shown within the same pixel frame (or pixel profile) as the originally published image 213. In practice, the reference script may be used to initiate a direct data link between the end-user device 206 and the service provider 220. In one embodiment, such direct data link is provided by creating a direct communication link (not shown) between the end-user device 206 and the content server 221. As such, the service provider 220 can deliver executable code (or text instructions that can be compiled into executable code) directly to the end-user device 206. In one embodiment, the executable code (or instructions) is processed by the web browser 208 on the end-user device 206 to display the contextually relevant content in a spatial relationship with respect to the image 213. Such executable code (or instructions) may be configured to modify or otherwise animate the image in order to highlight to the user 205 that the contextually relevant content is specifically related to the image 213.

Figure 3:
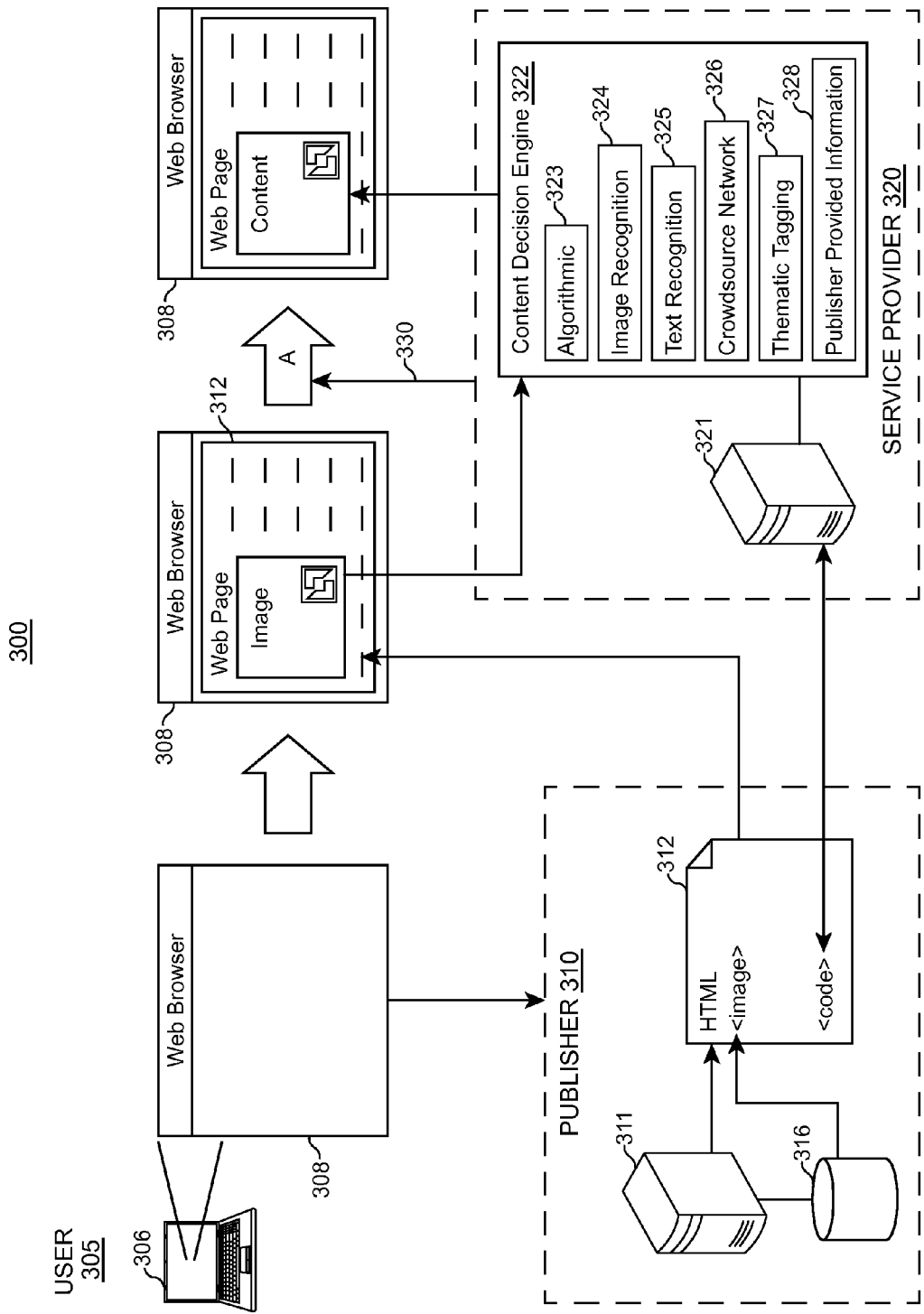
FIG. 3 is a high-level diagram illustrating yet another embodiment of the present invention.

FIG. 3 is a high-level diagram illustrating yet another embodiment of a system and method 300 for displaying contextually relevant content in association with an image published on a digital content platform. As in FIG. 2, the system and method 300 of FIG. 3 is described with relation to a digital content platform in the form of a web page. As would be understood by one of skill in the art, however, the system and method 300 may also be employed in various equivalent digital content platforms, such as, browser-based web applications, software applications, mobile device applications (e.g., phone or tablet applications), TV widgets, and equivalents thereof.

As shown, a publisher 310 provides an HTML web page 312 from its server 311, and includes a reference to an image on its image database 316, and an embed code received from the service provider 320. A user 305 then employs an end-user device 306 and web browser 308 to access the web page script 312 on the publisher's server 311. The user's web browser 308 then loads the web page 312. The web page 312 may include content such as an image 313 and text 315. The image may include one or more hotspots 314, or other means of activating the image. In one embodiment, the image 313 is not originally published with a hotspot 314, but instead has a hotspot activated after the service provider 320 has identified and analyzed the image.

The embed code functions to call on the service provider 320. The embed code may also create a direct link between the end-user device 306 and the service provider 320. As such, the service provider 320 can deliver software code (or corresponding computer-readable instructions) that function to: 1) identify one or more images published on the web page, 2) identify and/or set event handlers that watch for user activity; and/or 3) collect data on the image, text, user, publisher, and any other valuable information for analyzing the image and identifying contextually relevant content that may be beneficial to the user. In one embodiment, the software code (or corresponding computer-readable instructions) may be pre-configured (by the service provider 320, the publisher 310, and/or a third-party merchant) to only identify and analyze images that meet certain pre-set criteria. For example, if the publisher 310 wants to use his images for advertisement purposes, the service provider 320 can identify images that meet marketable requirements (set by either the publisher or a third-party merchant) in order to identify contextually relevant advertisements to display in a spatial relationship with the image.

After identifying the published image, the service provider 320 processes the image (or multiple images) through a content decision engine 322, in order to identify content that is contextually relevant to the image(s). Such contextually relevant content is then returned to the end-user device 306 for display within the web browser 308. Arrow 330 also indicates that the service provider 320 provides executable code (or computer-readable instructions that can be compiled into executable code) to modify or otherwise animate (Arrow A of FIG. 3) the image in order to highlight to the user 305 that the contextually relevant content is specifically related to the image 313. For example, in one embodiment, the executable code (or computer-readable instructions that can be compiled into executable code) employs CSS language to perform a flip animation on the image 313, so as to show the contextually relevant content on the apparent backside of the image. Preferably, the executable code (or computer-readable instructions that can be compiled into executable code) displays the contextually relevant content within the same pixel profile (i.e., the same pixel space, or same screen location) of the originally published image 313. As such, the contextually relevant content can be displayed without affecting any of the other content published on the web page 312.

To function as a means for identifying contextually relevant content for the image 313, the content decision engine 322 may employ analysis system components such as: algorithmic identification 323 or analysis of the image; image recognition protocols 324 and analysis of the image; proximate text recognition 325 in search of contextual information of the image based on text 315 published proximate to the image 313; submission of the image to a crowdsource network 326 to identify the context of the image and tag the image with relevant data; a thematic tagging engine 327 to identify and tag the image with relevant data, based on a pre-defined theme; publisher provided information database 328; and/or any combinations or equivalents thereof.

Figure 4:
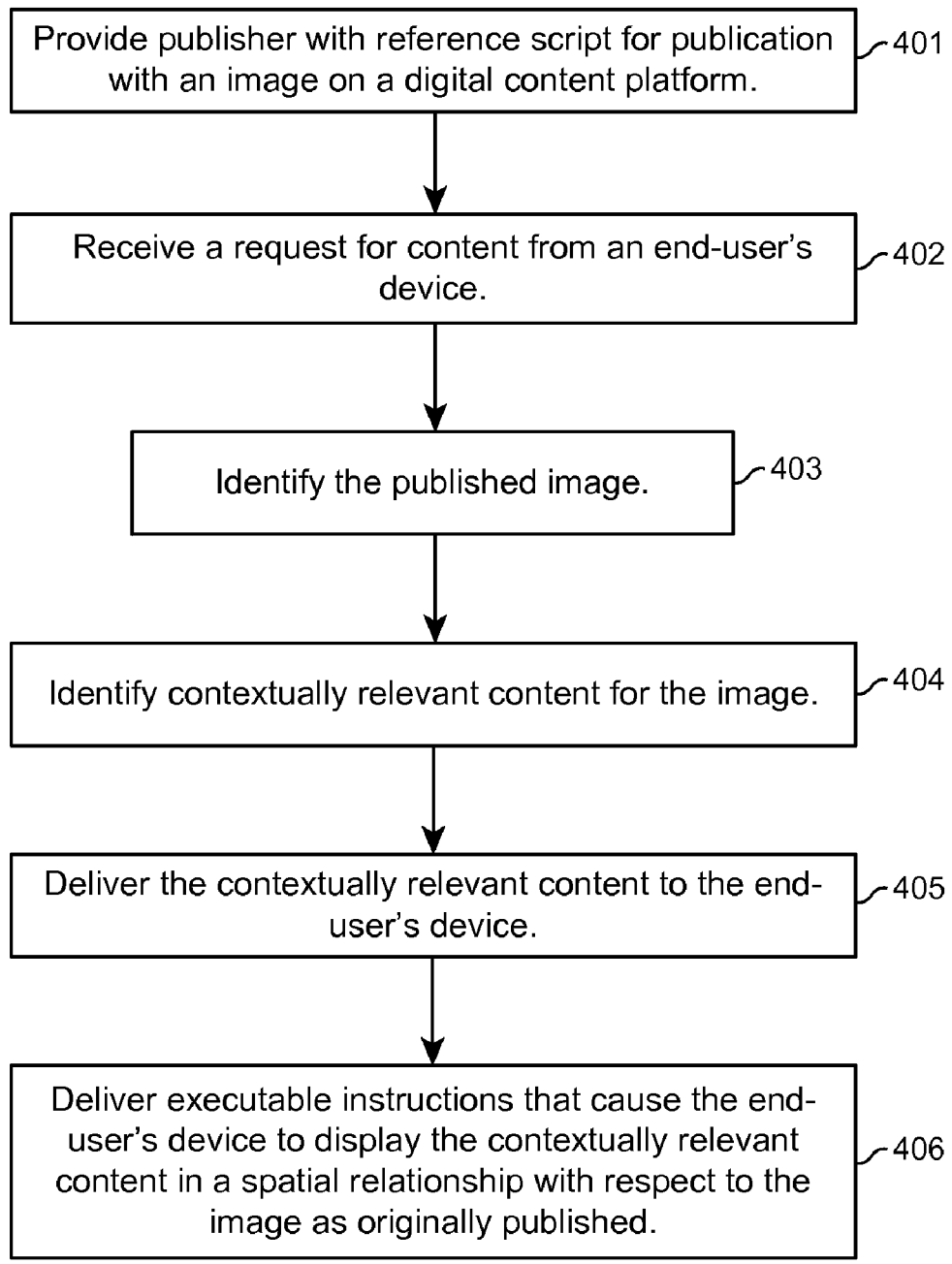
FIG. 4 is a flowchart describing one embodiment of the present invention.

FIG. 4 is a flowchart describing one embodiment of the present invention. More specifically, FIG. 4 shows a method 400 for providing contextually relevant content associated with an image published on a digital content platform. In step 401, a publisher is provided with a reference script for publication with an image on a digital content platform. In practice, the reference script directs an end-user device to a service provider, which receives a request for content from the end-user's device in step 402. In step 403, the published image is identified by, for example, one or more the means described above. In step 404, contextually relevant content is identified by, for example, one or more of the means described above. In step 405, the contextually relevant content is delivered to the end-user device. In step 406, executable instructions are also delivered to the end-user device. The executable instructions are configured to cause the end-user's device to display the contextually relevant content in a spatial relationship with respect to the image as originally published.

Figure 5:
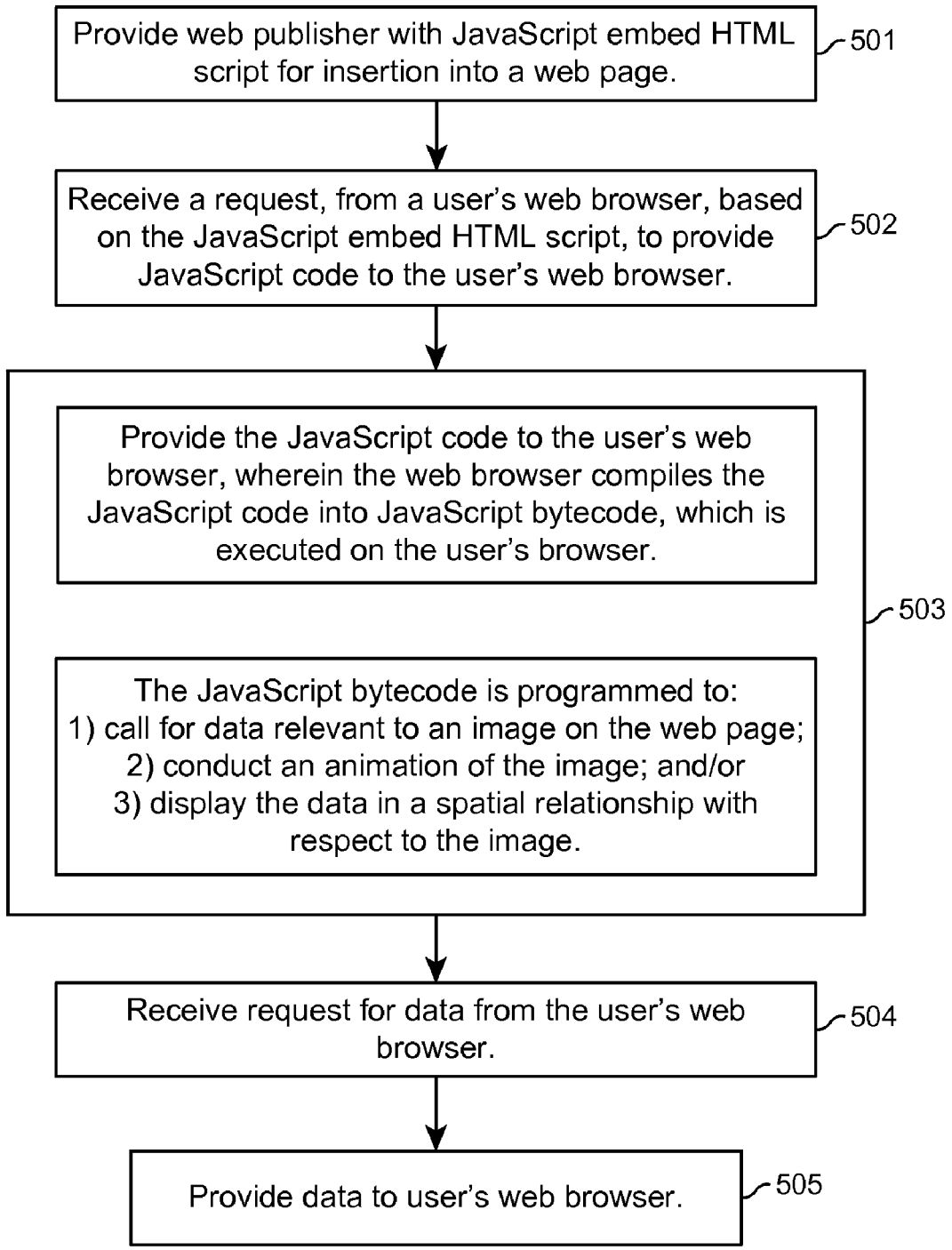
FIG. 5 is a flowchart describing another embodiment of the present invention.

FIG. 5 is a flowchart describing another embodiment of the present invention. More specifically, FIG. 5 shows a method 500 for providing contextually relevant content associated with an image published on a digital content platform, such as a web page. In step 501, a web publisher is provided with a JavaScript embed HTML script for insertion into a web page having at least one image. In step 502, based on the JavaScript embed HTML script, the method includes receiving a request to provide JavaScript code to the user's web browser. In step 503, JavaScript code is provided to the user's web browser, wherein the web browser compiles the JavaScript code into JavaScript bytecode, which is executed on the user's browser. In one embodiment, the JavaScript code is configured such that the compiled JavaScript bytecode is programmed to: 1) call for data (or content) relevant to an image on the web page; 2) conduct an animation of the image on the web page; and/or 3) display the data (or content) in a spatial relationship with respect to the image. In step 504, a content server (or more generally a service provider) receives a request for data (or content) from the user's web browser, wherein said request is initiated by the JavaScript bytecode. In step 505, the content server (or service provider) provides the data (or content) to the user's web browser.

Figure 7A:
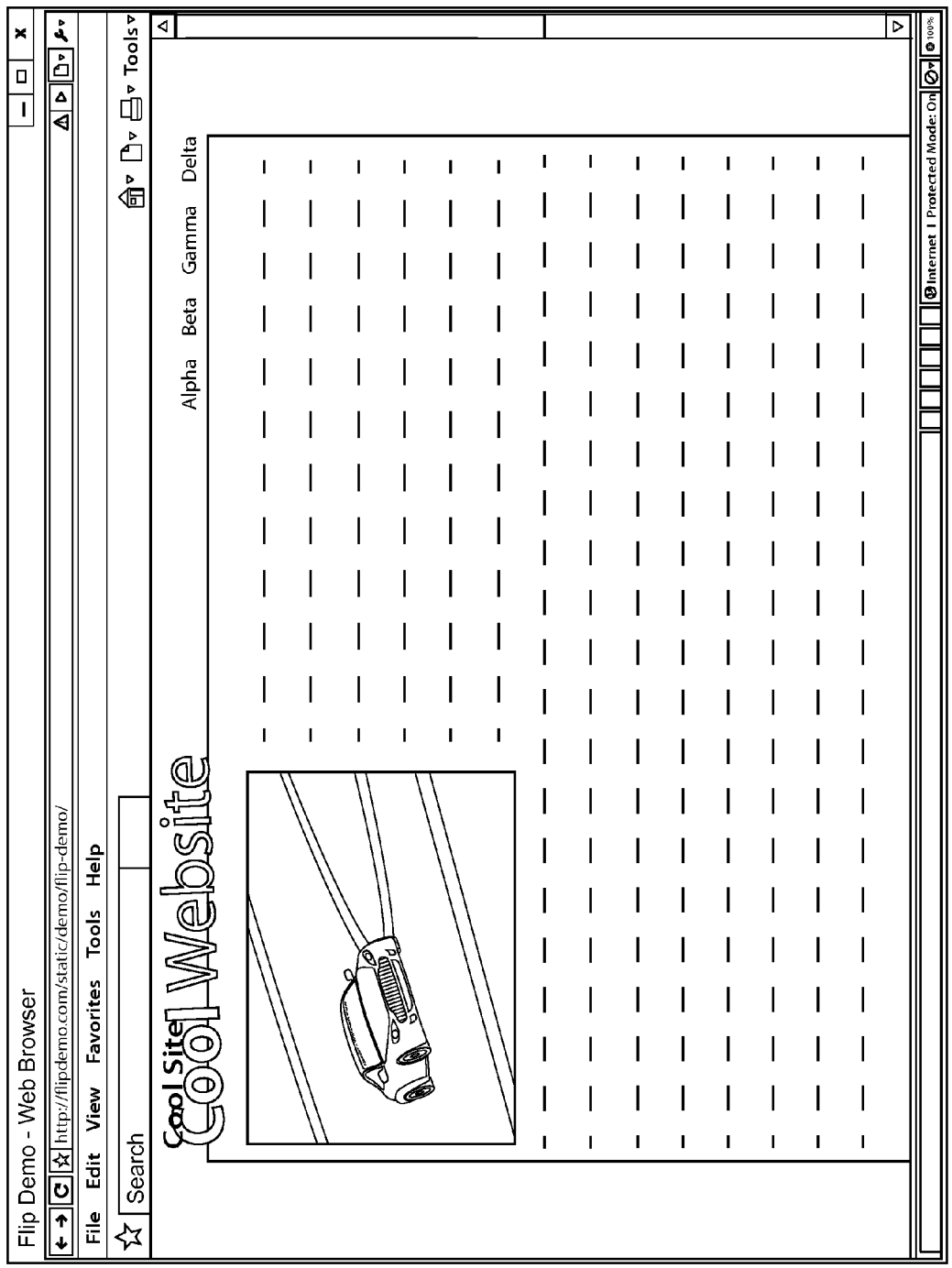
FIG. 7A shows one perspective view of an implementation of the present invention.
Figure 7B:
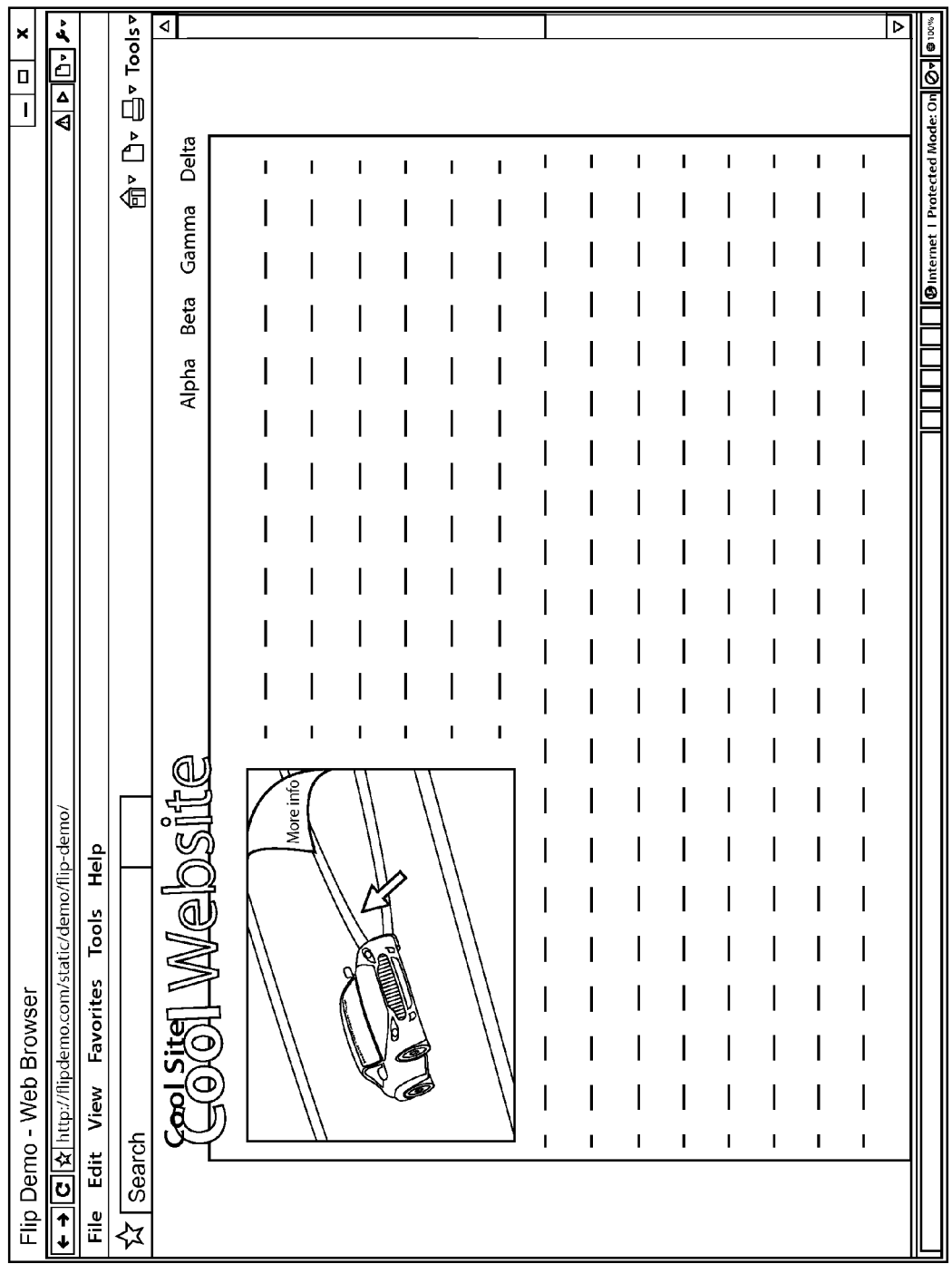
FIG. 7B shows a perspective view of an implementation of the present invention.
Figure 7C:
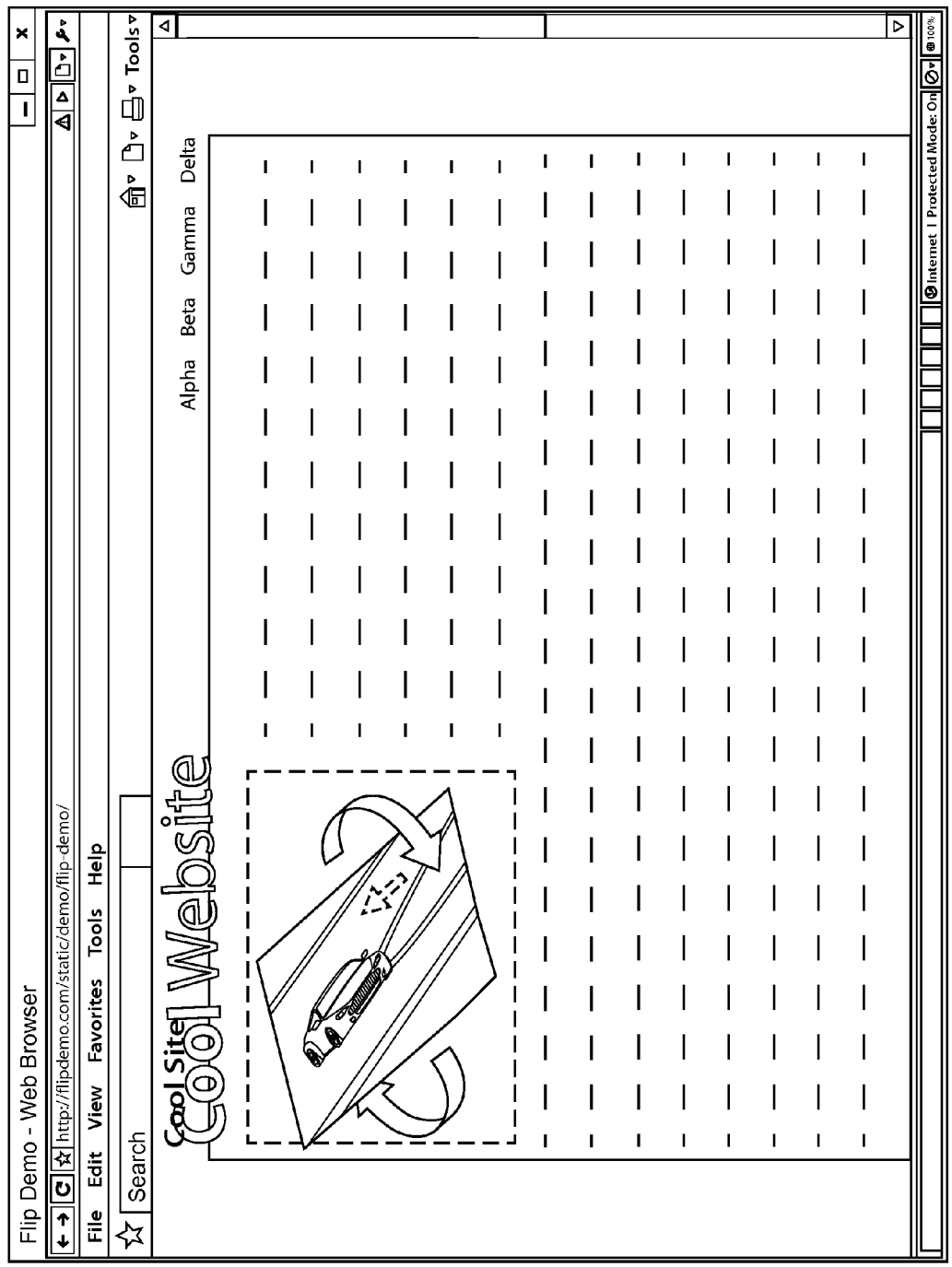
FIG. 7C shows a perspective view of an implementation of the present invention.
Figure 7D:
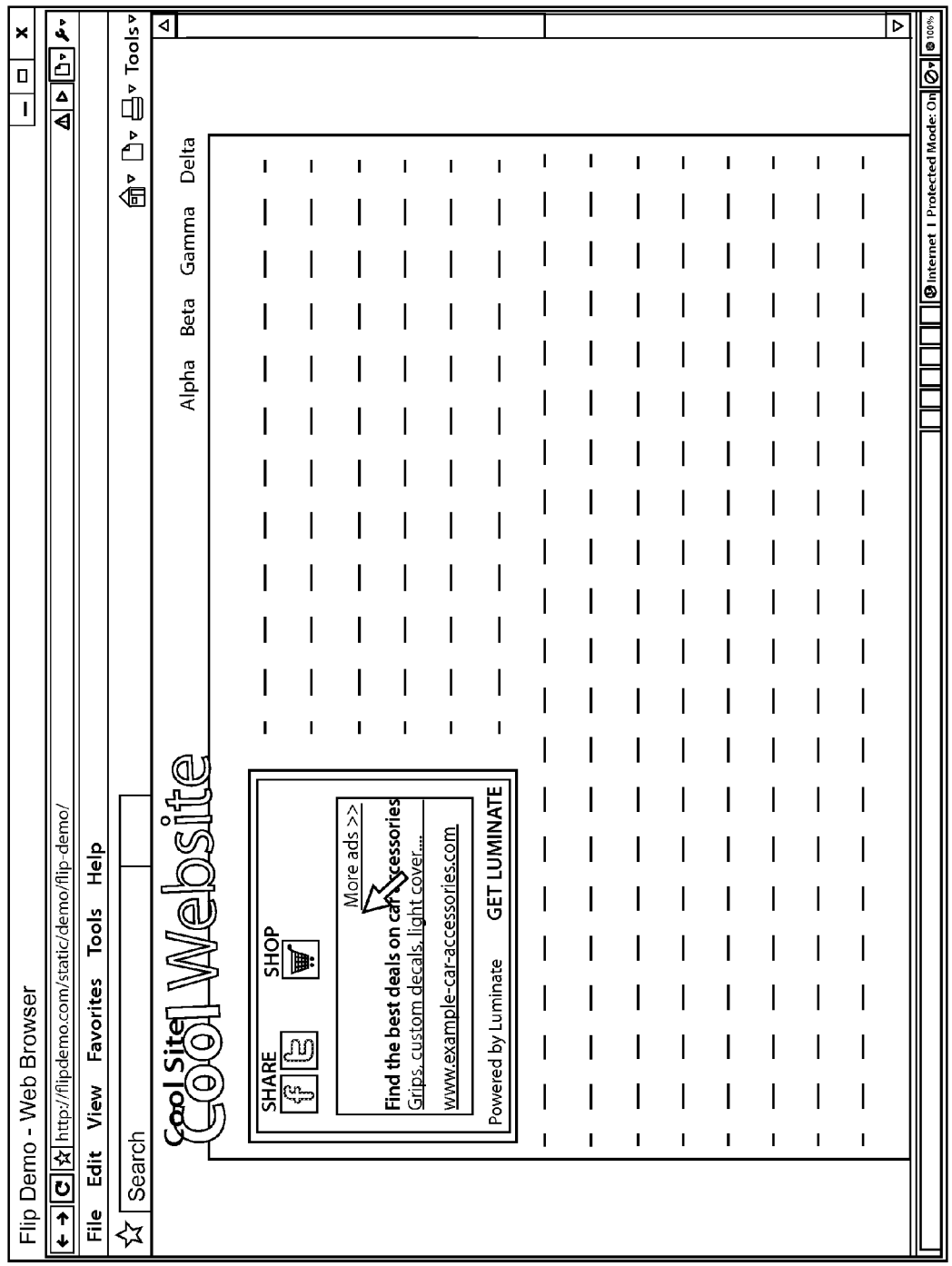
FIG. 7D shows a perspective view of an implementation of the present invention.

FIGS. 7A-7D show perspective views of an implementation of the present invention. More specifically, FIGS. 7A-7D show the present invention from the perspective of an end-user. In practice, a user accesses a website, as shown in FIG. 7A. The website may include an image as well as text (shown in dashed lines). In FIG. 7B, a user "mouses" over the image to activate the image. As shown, a hotspot or tab is displayed indicating that by further activating the image (e.g., clicking the image) additional information is available. In FIG. 7C, the user has clicked onto the image. A request for content is then sent to the service provider, as described above. The service provider then delivers executable instructions that causes the user's browser to animate the image (e.g., by flipping the image). In FIG. 7D, a user is shown contextually relevant content on the apparent backside of the image. Such content is provided by the service provider in response to the user's clicking of the image. Such content may include text related to the image, applications to share or comment on the image, applications and/or links for purchasing products seen within the image, etc. Such content is also shown in a spatial relationship with the image (e.g., the content is provided within the same pixel frame, same pixel space, or same screen location as the originally published image).

Additional Embodiments

In one embodiment, there is provided a computer-implemented method for displaying contextually relevant content associated with an image published on a digital content platform. The method comprises: (1) providing a publisher of the image with a reference script for publication with the image, wherein the reference script is a computer-readable instruction that causes an end-user device to call to a content server; and (2) configuring the content server to (a) receive a request for content from the end-user device, (b) identify the published image, (c) identify content that is contextually relevant to the image, (d) deliver the content to the end-user device, and (e) deliver a computer-readable instruction that causes the end-user device to perform an animation that displays the content in a spatial relationship with respect to the image as originally published. The content may be identified by a crowdsourcing network, a thematic tagging engine, a computer-based algorithm, an image recognition engine, a text recognition engine that identifies text published proximate to the image on the digital content platform, based on publisher provided data, and/or any additional equivalent means. The computer-readable instructions, which cause the end-user device to perform the animation, may incorporate CSS language, JavaScript language, HTML 5 Canvas language, or any equivalent language. The spatial relationship may be defined such that the content appears to be displayed on a backside of the image. The spatial relationship may also and/or alternatively be defined such that the content is displayed within a pixel profile of the image as originally published. For example, in one embodiment, the spatial relationship is defined such that the animation and/or contextually relevant content completely covers the originally published image. The content server may further be configured to: (3) deliver computer-readable instructions that cause the end-user device to identify whether the image meets one or more pre-defined requirements before calling to the content server; (4) deliver computer-readable instructions that require the end-user to activate the image before calling to the content server; and/or (5) deliver computer-readable instructions that cause the end-user device to communicate data directly with the content server.

In another embodiment, there is provided a computer-implemented method for displaying contextually relevant content associated with an image published on a digital content platform. The method includes: (1) providing a publisher of the image with an embed code for publication with the image, wherein the embed code is a computer-readable instruction that causes an end-user device to call to a dedicated content server; and (2) configuring the dedicated content server to (a) receive a request for content from the end-user device, (b) identify the published image, (c) identify contextually relevant content for the image, (d) deliver the contextually relevant content to the end-user device, and (e) deliver a computer-readable instruction that causes the end-user device to perform an animation that modifies the image and thereafter displays the contextually relevant content in a spatial relationship with the image as originally published. The contextually relevant content may be identified by a crowdsourcing network, a thematic tagging engine, a computer-based algorithm, an image recognition engine, a text recognition engine that identifies text published proximate to the image on the digital content platform, based on publisher provided data, and/or any additional equivalent means. The computer-readable instructions, which cause the end-user device to perform the animation that modifies the image, may incorporate CSS language, JavaScript language, HTML 5 Canvas language, or any equivalent language. The spatial relationship may be defined such that the contextually relevant content appears to be displayed on a backside of the image. The embed code may include computer-readable instructions that cause the end-user device to identify whether the image meets one or more pre-defined requirements before calling to the dedicated content server. The embed code may include computer-readable instructions that require the end-user to activate the image, with a user-actionable event, before calling to the dedicated content server. The dedicated server may be further configured to deliver computer-readable instructions that cause the end-user device to communicate data directly with the dedicated server.

In another embodiment, there is provided a computer-implemented method of displaying contextually relevant content (e.g., advertisements) on images published on a digital content platform (e.g., images published within a mobile application on a mobile device). The method includes providing the digital content platform (e.g., the mobile application on the mobile device) with an interface for: (1) a user to activate the image, and/or (2) the digital content platform to send images, image identifiers, image hashes, image unique reference locators (URLs), etc., to a service provider computer system. The interface can be in the form of hotspots, icons, or other actionable buttons, as well as an application programming interface linked to the service provider computer system. When the user activates the interface (e.g., by touching a screen icon), the image (or image identifier, etc.) is sent to a service provider for processing. The service provider's computer system receives a request for content from the user's device based on the user's activation of the icon. The service provider's computer system can then (a) identify the published image, (b) identify content that is contextually relevant to the image, (c) deliver the content to the end-user device, and/or (d) deliver a computer-readable instruction that causes the end-user device to perform an animation that displays the content in a spatial relationship with respect to the image as originally published. In this way, mobile applications (i.e., "apps") that display (or scroll) multiple images across a limited screen space, can employ the teachings of this invention, to monetize the displayed images, without compromising the aesthetics of the mobile application. In other words, the mobile application can be set up so as to continue to display multiple images without associated advertisements. If and when a user is interested in a particular image, the user can activate an icon requesting additional content. The service provider can process the image through its content decision engine, and return relevant content (e.g., advertisements) back to the mobile application. An animation may then be employed to, for example, flip the image and display the relevant content on the backside of the image. In another embodiment, the animation can overlay the content onto the image itself. Preferably, the content is displayed with the same pixel space (or at least relatively close to the same pixel space) as the originally published image. As such, the relevant content can be displayed only if and when a user is actually interested in seeing additional relevant content. The display of the additional relevant content can be done without ruining the aesthetics of the mobile application. The relevant content can include links to advertisers/merchants where the user can purchase goods or services related to the contents/context of the originally displayed image.

Communication Between Parties Practicing the Present Invention.

In one embodiment, communication between the various parties and components of the present invention is accomplished over a network consisting of electronic devices connected either physically or wirelessly, wherein digital information is transmitted from one device to another. Such devices (e.g., end-user devices and/or servers) may include, but are not limited to: a desktop computer, a laptop computer, a handheld device or PDA, a cellular telephone, a set top box, an Internet appliance, an Internet TV system, a mobile device or tablet, or systems equivalent thereto. Exemplary networks include a Local Area Network, a Wide Area Network, an organizational intranet, the Internet, or networks equivalent thereto. The functionality and system components of an exemplary computer and network are further explained in conjunction with FIG. 6, below.

Computer Implementation.

Figure 6:
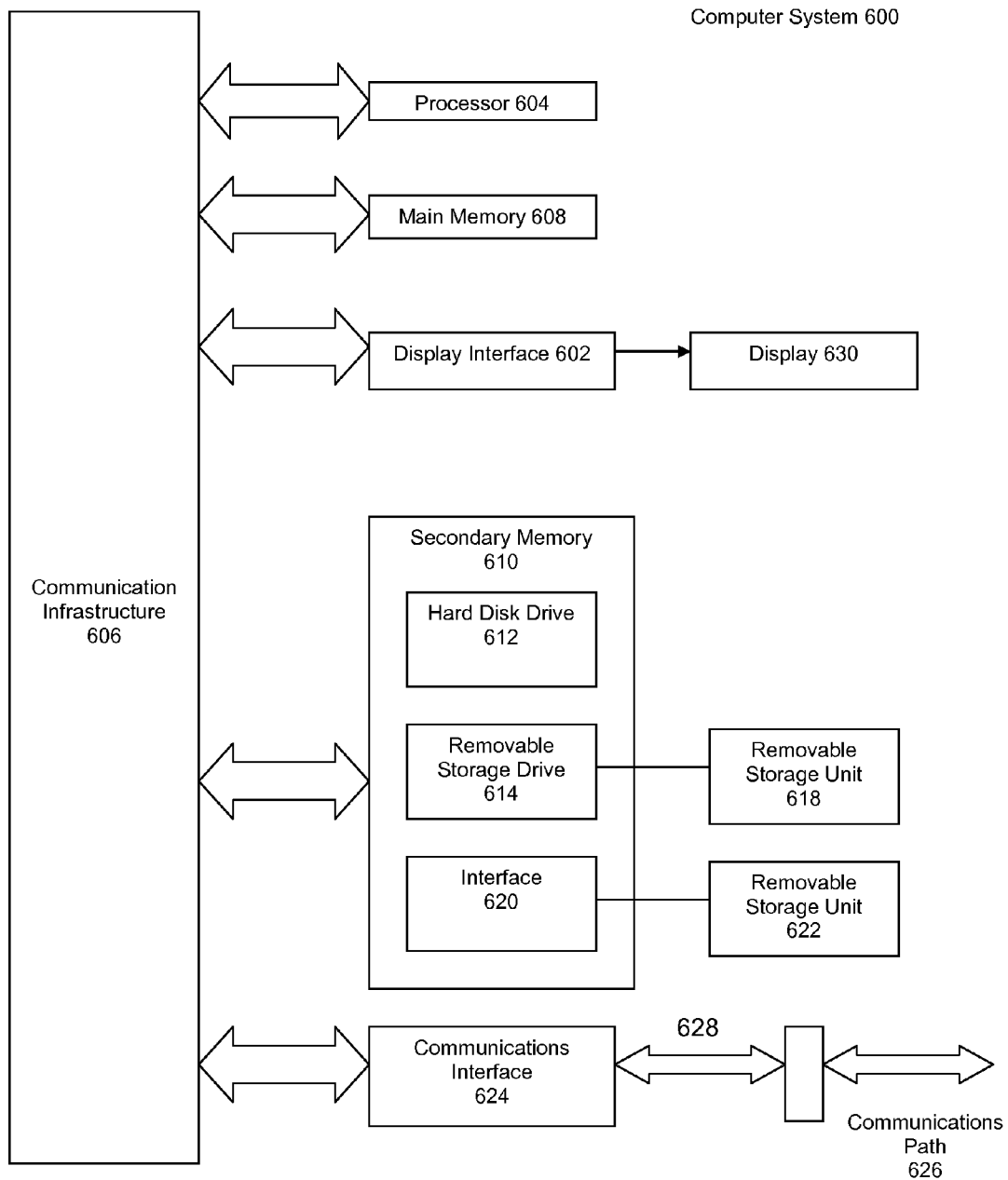
FIG. 6 is a schematic drawing of a computer system used to implement the methods presented.

In one embodiment, the invention is directed toward one or more computer systems capable of carrying out the functionality described herein. For example, FIG. 6 is a schematic drawing of a computer system 600 used to implement the methods presented above. Computer system 600 includes one or more processors, such as processor 604. The processor 604 is connected to a communication infrastructure 606 (e.g., a communications bus, cross-over bar, or network). Computer system 600 can include a display interface 602 that forwards graphics, text, and other data from the communication infrastructure 606 (or from a frame buffer not shown) for display on a local or remote display unit 630.

Computer system 600 also includes a main memory 608, such as random access memory (RAM), and may also include a secondary memory 610. The secondary memory 610 may include, for example, a hard disk drive 612 and/or a removable storage drive 614, representing a floppy disk drive, a magnetic tape drive, an optical disk drive, flash memory device, etc. The removable storage drive 614 reads from and/or writes to a removable storage unit 618. Removable storage unit 618 represents a floppy disk, magnetic tape, optical disk, flash memory device, etc., which is read by and written to by removable storage drive 614. As will be appreciated, the removable storage unit 618 includes a computer usable storage medium having stored therein computer software, instructions, and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow computer software, instructions, and/or data to be transferred from the removable storage unit 622 to computer system 600.

Computer system 600 may also include a communications interface 624. Communications interface 624 allows computer software, instructions, and/or data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, a radio frequency (RF) link, a wireless communication link, and other communications channels.

In this document, the terms "computer-readable storage medium," "computer program medium," and "computer usable medium" are used to generally refer to media such as removable storage drive 614, removable storage units 618, 622, data transmitted via communications interface 624, and/or a hard disk installed in hard disk drive 612. These computer program products provide computer software, instructions, and/or data to computer system 600. These computer program products also serve to transform a general purpose computer into a special purpose computer programmed to perform particular functions, pursuant to instructions from the computer program products/software. Embodiments of the present invention are directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features of the present invention, as discussed herein. In particular, the computer programs, when executed, enable the processor 604 to perform the features of the presented methods. Accordingly, such computer programs represent controllers of the computer system 600. Where appropriate, the processor 604, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into computer system 600 using removable storage drive 614, interface 620, hard drive 612, communications interface 624, or equivalents thereof. The control logic (software), when executed by the processor 604, causes the processor 604 to perform the functions and methods described herein.

In another embodiment, the methods are implemented primarily in hardware using, for example, hardware components such as application specific integrated circuits (ASICs). Implementation of the hardware state machine so as to perform the functions and methods described herein will be apparent to persons skilled in the relevant art(s). In yet another embodiment, the methods are implemented using a combination of both hardware and software.

Embodiments of the invention, including any systems and methods described herein, may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

For example, in one embodiment, there is provided a computer-readable storage medium, stored on a content server, for displaying contextually relevant content associated with an image published on a digital content platform. The computer-readable storage medium includes instructions executable by at least one processing device that, when executed, cause the processing device to: (a) receive a request for content from an end-user device, wherein the end-user device is directed to the content server via a reference script published with the image on the digital content platform; (b) identify contextually relevant content for the image; (c) deliver the contextually relevant content to the end-user device; and (d) deliver a computer-readable instruction that causes the end-user device to perform an animation that modifies the image and thereafter displays the contextually relevant content in a spatial relationship with the image as originally published. The computer-readable storage medium may further comprise instructions executable by at least one processing device that, when executed, cause the processing device to (e) provide the image to a crowdsourcing network, and receive the contextually relevant content from the crowdsourcing network; (f) provide the image to a thematic tagging engine, and receive the contextually relevant content from the thematic tagging engine; (g) deliver the image to the thematic tagging engine, and receive at least one thematic tag from the thematic tagging engine; (h) identify contextually relevant content for the image based on the thematic tag; (i) identify whether the image meets one or more pre-defined requirements; and/or (j) require the end-user to activate the image, with a user-actionable event, before calling to the dedicated content server. The contextually relevant content for the image may be identified based on text published proximate to the image on the digital content platform. The computer-readable instruction, which causes the end-user device to perform the animation that modifies the image, may incorporate CSS language, JavaScript language, HTML 5 Canvas language, or any equivalent language. The spatial relationship may be defined such that the contextually relevant content appears to be displayed on a backside of the image.

In another embodiment, there is provided a computer-readable storage medium, stored on a dedicated content server, for displaying contextually relevant content associated with an image published on a digital content platform, comprising instructions executable by at least one processing device that, when executed, cause the processing device to: (a) receive a request for content from an end-user device, wherein the end-user device is directed to the dedicated content server via embed code published along with the image on the digital content platform; (b) identify the published image; (c) identify contextually relevant content for the image, (d) deliver the contextually relevant content to the end-user device, and (e) deliver a computer-readable instruction that causes the end-user device to perform an animation that modifies the image and thereafter displays the contextually relevant content in a spatial relationship with the image as originally published. The computer-readable storage medium may further comprise instructions executable by at least one processing device that, when executed, cause the processing device to: (f) deliver the image to the crowdsourcing network, and receive contextually relevant content from the crowdsourcing network; (g) deliver the image to the thematic tagging engine, and receive at least one thematic tag from the thematic tagging engine; (h) identify contextually relevant content for the image based on the thematic tag; (i) identify whether the image meets one or more pre-defined requirements; and/or (j) deliver a computer-readable instruction that causes the end-user device to require the end-user to activate the image, with a user-actionable event, before calling to the dedicated content server. The contextually relevant content for the image may be identified with a crowdsourcing network; a thematic tagging engine; and/or based on text published proximate to the image on the digital content platform. The computer-readable instruction, which causes the end-user device to perform the animation that modifies the image, may incorporate CSS language, JavaScript language, HTML 5 Canvas language, or any equivalent language. The spatial relationship may be defined such that the contextually relevant content appears to be displayed on a backside of the image.

CONCLUSION

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible. Further, each system component and/or method step presented should be considered a "means for" or "step for" performing the function described for said system component and/or method step. As such, any claim language directed to a "means for" or "step for" performing a recited function refers to the system component and/or method step in the specification that performs the recited function, as well as equivalents thereof.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A computer-implemented method for displaying contextually relevant content associated with an image published on a digital content platform, comprising:
providing a publisher of the image with a reference script for publication with the image, wherein the reference script is a computer-readable instruction that causes an end-user device to provide a user-actionable interface that allows a user to activate the image and thereby perform a request for content call to a content server; and configuring the content server to
(a) receive the request for content call from the end-user device,
(b) identify the published image,
(c) identify whether the image meets one or more predefined requirements,
(d) identify content that is contextually relevant to the image,
(e) deliver the content to the end-user device, and
(f) deliver a computer-readable instruction that causes the end-user device to perform an animation that displays the content in a spatial relationship with respect to the image as originally published, wherein the spatial relationship is defined such that the content appears to be displayed on a backside of the image.

2. The computer-implemented method of claim 1, wherein the content is identified with a crowdsourcing network.

3. The computer-implemented method of claim 1, wherein the content is identified with a thematic tagging engine.

4. The computer-implemented method of claim 1, wherein the content is identified based on text published proximate to the image on the digital content platform.

5. The computer-implemented method of claim 1, wherein the computer-readable instructions, which cause the end-user device to perform the animation, incorporates CSS language, JavaScript language, or HTML 5 Canvas language.

6. The computer-implemented method of claim 1, the content server is further configured to:
deliver computer-readable instructions that cause the end-user device to communicate data directly with the content server.

7. A non-transitory computer-readable storage medium, stored on a content server, for displaying contextually relevant content associated with an image published on a digital content platform, comprising:
instructions executable by at least one processing device that, when executed, cause the processing device to
(a) receive a request for content from an end-user device, wherein the end-user device is directed to the content server via a reference script published with the image on the digital content platform, and wherein the reference script requires an end-user to active the image, with a user-actionable event, before transmitting the request for content to the content server,
(b) identify whether the image meets one or more predefined requirements,
(c) identify contextually relevant content for the image,
(d) deliver the contextually relevant content to the end-user device, and
(e) deliver a computer-readable instruction that causes the end-user device to perform an animation that modifies the image and thereafter displays the contextually relevant content in a spatial relationship with the image as originally published, wherein the spatial relationship is defined such that the content appears to be displayed on a backside of the image.

8. The computer-readable storage medium of claim 7, further comprising:
instructions executable by at least one processing device that, when executed, cause the processing device to provide the image to a crowdsourcing network, and receive the contextually relevant content from the crowdsourcing network.

9. The computer-readable storage medium of claim 7, further comprising:
instructions executable by at least one processing device that, when executed, cause the processing device to provide the image to a thematic tagging engine, and receive the contextually relevant content from the thematic tagging engine.

10. The computer-readable storage medium of claim 7, further comprising:
instructions executable by at least one processing device that, when executed, cause the processing device to deliver the image to the thematic tagging engine, and receive at least one thematic tag from the thematic tagging engine.

11. The computer-readable storage medium of claim 10, further comprising:
instructions executable by at least one processing device that, when executed, cause the processing device to identify contextually relevant content for the image based on the thematic tag.

12. The computer-readable storage medium of claim 7, wherein the contextually relevant content for the image is identified based on text published proximate to the image on the digital content platform.

13. The computer-readable storage medium of claim 7, wherein the computer-readable instruction, which causes the end-user device to perform the animation that modifies the image, incorporates CSS language, JavaScript language, or HTML 5 Canvas language.

14. A non-transitory computer-readable storage medium for displaying contextually relevant content associated with an image published on a mobile application, comprising:
  instructions executable by at least one processing device that, when executed, cause the processing device to
  (a) publish multiple images on a user interface for the mobile application,
  (b) provide an actionable user interface that allows an end-user to request additional content relevant to a particular image,
  (c) request additional content from a content server, after the end-user has activated the image via the actionable user interface,
  (d) receive contextually relevant content for the image from the content server, and
  (e) perform an animation that modifies the image and thereafter displays the contextually relevant content in a spatial relationship with the image as originally published, wherein the spatial relationship is defined such that the contextually relevant content appears to be displayed on a backside of the image.

* * * * *